US012579562B2

(12) United States Patent
Sakata

(10) Patent No.: US 12,579,562 B2
(45) Date of Patent: Mar. 17, 2026

(54) FASHION DATABASE SYSTEM, METHOD FOR CONTROLLING FASHION DATABASE, AND FASHION DATABASE PROGRAM

(71) Applicant: KABUSHIKI KAISHA ToTomorrow, Fukuoka (JP)

(72) Inventor: Tomohiro Sakata, Fukuoka (JP)

(73) Assignee: KABUSHIKI KAISHA ToTomorrow, Fukuoka (JP)

( * ) Notice: Subject to any disclaimer, the term of this patent is extended or adjusted under 35 U.S.C. 154(b) by 319 days.

(21) Appl. No.: 17/981,087

(22) Filed: Nov. 4, 2022

(65) Prior Publication Data

US 2023/0060752 A1 Mar. 2, 2023

Related U.S. Application Data

(63) Continuation of application No. PCT/JP2021/017011, filed on Apr. 28, 2021.

(30) Foreign Application Priority Data

May 29, 2020 (JP) ................................. 2020-094726

(51) Int. Cl.
*G06Q 30/00* (2023.01)
*G06Q 10/087* (2023.01)
*G06Q 30/0601* (2023.01)

(52) U.S. Cl.
CPC ....... *G06Q 30/0613* (2013.01); *G06Q 10/087* (2013.01)

(58) Field of Classification Search
CPC ............. G06Q 10/087; G06Q 30/0613; G06Q 30/0615; G06Q 10/0872; G06Q 10/08724;

(Continued)

(56) References Cited

U.S. PATENT DOCUMENTS

| | | | | |
|---|---|---|---|---|
| 11,100,459 | B2 * | 8/2021 | Ponte | .................... G06F 16/903 |
| 11,232,511 | B1 * | 1/2022 | Zehr | ..................... G06V 20/70 |

(Continued)

FOREIGN PATENT DOCUMENTS

| | | |
|---|---|---|
| JP | 2003-256741 A | 9/2003 |
| JP | 2005-85133 A | 3/2005 |

(Continued)

OTHER PUBLICATIONS

International Search Report issued in PCT/JP2021/017011 mailed on Jul. 20, 2021 with English Translation (7 pages).

(Continued)

*Primary Examiner* — Robert M Pond
(74) *Attorney, Agent, or Firm* — Nakanishi IP Associates, LLC

(57) ABSTRACT

A fashion database system includes a database that manages information on a merchant that keeps and manages clothes, information on a user who leaves clothes with the merchant, rental availability information indicating whether the clothes left by the user can be lent to a third party, and transaction availability information indicating whether the clothes can be sold to a third party, and a management server that mutually communicates with the database. The management server processes, on the basis of the rental availability information stored in the database, a rental request from a third party who wishes to rent the clothes left by the user; processes a purchase request from a third party who wishes to purchase the clothes left by the user; and updates the information stored in the database in response to a change request to the rental availability information or the transaction availability information from the user.

10 Claims, 10 Drawing Sheets

(58) Field of Classification Search

CPC ....... G06Q 10/08726; G06Q 10/08728; G06Q 10/0874; G06Q 10/083; G06Q 10/08741; G06Q 10/08743; G06Q 10/08744; G06Q 10/0877; G06Q 10/08772; G06Q 10/08774; G06Q 10/08776; G06Q 10/08778

See application file for complete search history.

(56) References Cited

U.S. PATENT DOCUMENTS

| | | | | |
|---|---|---|---|---|
| 2013/0151371 A1* | 6/2013 | Moss | ................. | G06Q 30/0633 |
| | | | | 705/26.8 |
| 2014/0236753 A1* | 8/2014 | Abhyanker | ............. | H04L 51/52 |
| | | | | 705/28 |
| 2015/0066741 A1* | 3/2015 | Wannamaker | ......... | G06Q 40/00 |
| | | | | 705/39 |
| 2016/0321547 A1* | 11/2016 | Johnson | ............. | G06Q 10/0631 |
| 2017/0243282 A1* | 8/2017 | Koulis | ................... | G06Q 30/08 |
| 2018/0005375 A1* | 1/2018 | Krimon | ................ | G06Q 10/087 |
| 2018/0060937 A1* | 3/2018 | Shu | ........................ | D06F 34/18 |
| 2018/0197223 A1* | 7/2018 | Grossman | ............ | G06F 3/0482 |
| 2020/0042822 A1* | 2/2020 | Chae | ................. | G01N 21/3581 |
| 2021/0174118 A1* | 6/2021 | Chhabra | ............. | G06V 20/635 |
| 2021/0312539 A1 | 10/2021 | Imafuku | | |

FOREIGN PATENT DOCUMENTS

| | | | |
|---|---|---|---|
| JP | 2007-299111 | A | 11/2007 |
| JP | 2008-269429 | A | 11/2008 |
| JP | 2013-110530 | A | 6/2013 |
| JP | 2016-18400 | A | 2/2016 |
| JP | 2016-62222 | A | 4/2016 |
| JP | 6561389 | B1 | 8/2019 |
| JP | 2020-30783 | A | 2/2020 |
| JP | 2020-173734 | A | 10/2020 |
| WO | 2020/059747 | A1 | 3/2020 |

OTHER PUBLICATIONS

Written Opinion of International Searching Authority issued in PCT/JP2021/017011 mailed on Jul. 20, 2021 with English Translation (4 pages).

Nana Co., Ltd., How to, Online, May 12, 2020, [retrieval date: Sep. 16, 2020], Internet :<URL:https://web.archive.org/web/20200512104357/https://karitoke.jp/userguide>, entire text, (Nanashi., Inc., Online), with English translation (5 Pages).

Maruhisa Co., Ltd., Flow until check-in, Online, May 25, 2019, [retrieval date: Sep. 16, 2020], Internet: URL: https://web.archive.org/web/20190525034921/https://share.enjoy-kimono.com/>, entire text, non-official translation (Matuhisa Co., Ltd., "Flow", Online), with English translation (15 Pages).

* cited by examiner

FIG. 2
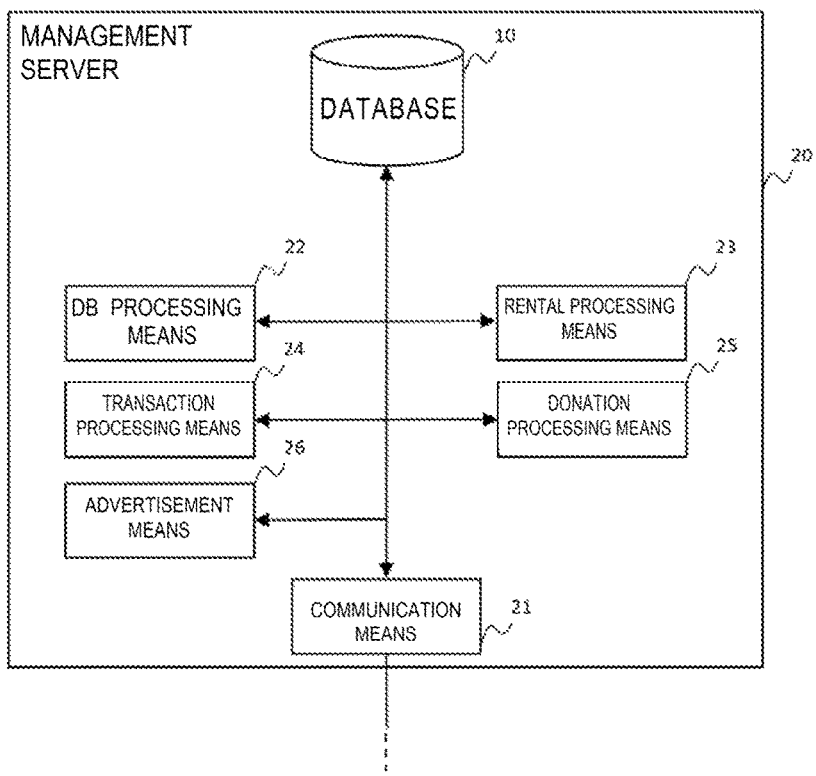
FIG. 3A
FIG. 3B
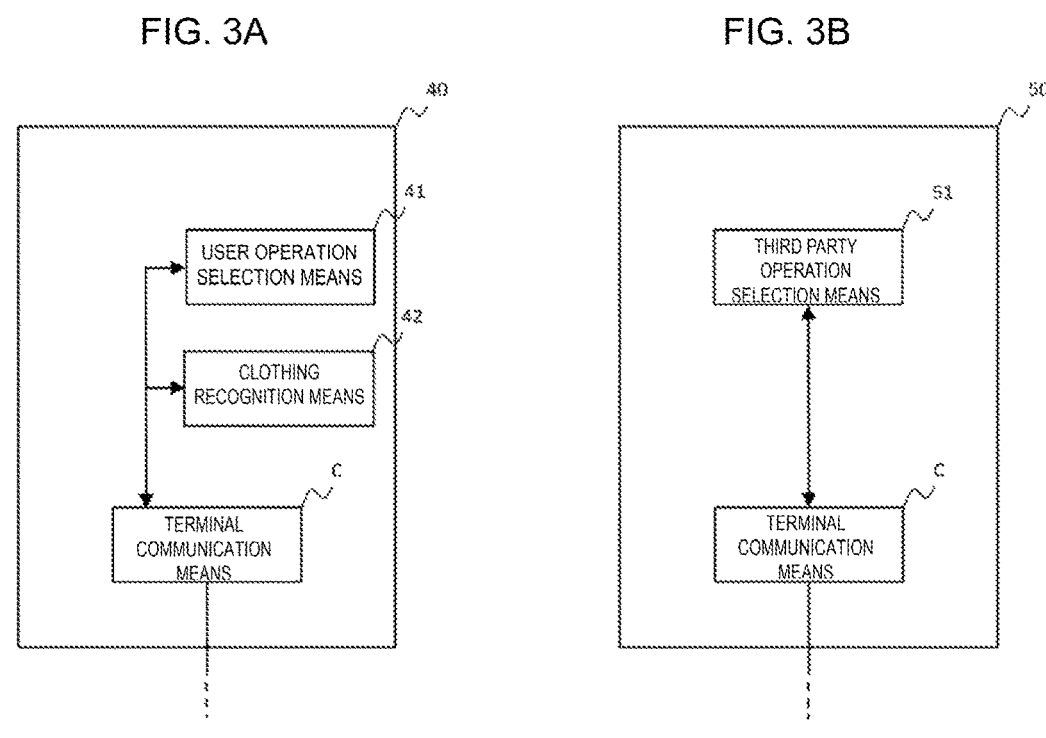

FIG. 4A

| USER ID | CLOTHING ID | SHOP ID | FACTORY ID | DISCLOSURE STATUS | FEE | BARGAINING |
|---------|-------------|---------|------------|-------------------|-----|------------|
| 101 | 201 | 301 | 401 | CLOSED TO PUBLIC | 0 | — |
| 102 | 202 | 302 | 402 | RENTAL | 500 | — |
| 103 | 203 | 303 | 403 | TRANSACTION | 5000 | OK |
| 104 | 204 | 304 | 404 | DONATION | 0 | — |

FIG. 4B

| CLOTHING ID | OVERALL IMAGE | BRAND | CARE LABEL | SIZE | CATEGORY | FREE WORD |
|-------------|---------------|-------|------------|------|----------|-----------|
| 201 | xxx | xxx | xxx | L | JACKET | xxx |
| 202 | xxx | xxx | xxx | S | DRESS SHIRT | xxx |
| 203 | xxx | xxx | xxx | M | SKIRT | xxx |
| 204 | xxx | xxx | xxx | LL | COAT | xxx |

FIG. 4C

| CLOTHING ID | WORKING CONDITION | STORAGE SITE | BORROWER | DATE OF RECEIPT | CARE HISTORY ID |
|-------------|-------------------|--------------|----------|-----------------|-----------------|
| 201 | WAITING FOR BORROWER | WAREHOUSE A | — | 2020. 4. 1 | 20101 |
| 202 | BEING RENT | — | 104 | 2020. 4. 7 | 20201 |
| 203 | IN STORAGE | WAREHOUSE B | — | 2020. 4. 8 | 20301 |
| 204 | BEING KEPT | — | — | 2020. 4. 14 | 20401 |

FIG. 4D

| USER ID | NAME | AGE | GENDER | ADDRESS | TELEPHONE NUMBER |
|---|---|---|---|---|---|
| 1 0 1 | XX TARO | 2 5 | MALE | x x x x | x x x x |
| 1 0 2 | XX JIRO | 3 5 | MALE | x x x x | x x x x |
| 1 0 3 | XX HARUKO | 4 6 | FEMALE | x x x x | x x x x |
| 1 0 4 | XX NATSUKO | 3 2 | FEMALE | x x x x | x x x x |

FIG. 4E

| CARE HISTORY ID | WEARING PERIOD | PURCHASE DATE | TOTAL CARE COUNT | CARE HISTORY 1 | CARE HISTORY 2 | ・・・ |
|---|---|---|---|---|---|---|
| 20101 | 1 YEAR | 2019.4.1 | 4 | 2019.7.1 DRY CLEANING | 2019.12.1 DRY CLEANING | ・・・ |
| 20201 | 1 YEAR 6 MONTHS | 2018.10.7 | 7 | 2018.12.30 DRY CLEANING | 2019.3.3 DRY CLEANING | ・・・ |
| 20301 | 2 YEARS | 2018.4.8 | 8 | 2019.1.15 DRY CLEANING CREASE PROCESSING | 2019.4.22 DRY WORK | ・・・ |
| 20401 | 2 YEARS 6 MONTH | 2017.10.14 | 1 0 | 2017.11.30 DRY CLEANING | 2018.3.16 DRY CLEANING, WATER REPELLENT FINISH | ・・・ |

FASHION DATABASE SYSTEM, METHOD FOR CONTROLLING FASHION DATABASE, AND FASHION DATABASE PROGRAM

TECHNICAL FIELD

The present invention relates to a fashion database system, a method for controlling a fashion database, and a fashion database program.

BACKGROUND ART

Clothes that follow a trend fashion and clothes updated every season are sold well, and so clothes increase without being noticed. As the number of clothes increases gradually and it is not until the space in the room becomes tight that people start thinking of sorting out (disposing of) unnecessary clothes. However, in general, it is a waste to just throw away clothes that are no longer worn, and it is often difficult to dispose of them.

Though not disposed of, clothes for each season such as summer and winter clothes are left unused for half a year after sending them to cleaners and occupy closet and other room spaces. It is therefore necessary to hygienically manage such clothes unused for a certain period of time outside the home so as to produce physical effective spaces in the room.

For effective use of unnecessary clothes, a clothing rental system described, for example, in Patent Literature 1 may be used. Patent Literature 1 describes a clothing rental system that allows people who wish to lend clothes or people who wish to borrow clothes to use the system with mutual peace of mind, and allows people who wish to borrow the clothes to easily and inexpensively borrow preferred clothes from a clothing group of a variety of personalities.

Patent Literature 2 describes a clothing recycling system that allows prospective sellers of used clothes to exhibit the clothes in like-new conditions and that allows prospective purchasers to select old clothes close to their expectations in good and clean conditions.

CITATION LIST

Patent Literature

Patent Literature 1: Japanese Patent Application Laid-Open No. 2003-256741
Patent Literature 2: Japanese Patent Application Laid-Open No. 2008-269429

SUMMARY OF INVENTION

Technical Problem

It may be possible to effectively use unnecessary clothes using the systems described in Patent Literatures 1 and 2. However, when using the systems described in Patent Literatures 1 and 2, it is necessary to select whether to rent or sell unnecessary clothes. People may change their minds and want to wear the clothes again by themselves. That is, unnecessary clothes tighten the room spaces and so people would not have them on hand, but a grace period is requested until a decision is made for disposing of or the like.

Thus, the present invention provides a highly convenient fashion database system, a method for controlling a fashion database and a fashion database program configured to manage clothes left by a user and allow the user to make subsequent choices at desired timing.

Solution to Problem

A fashion database system of the present invention includes: a database that manages information on a merchant that keeps and manages clothes, information on a user who leaves clothes with the merchant, rental availability information indicating whether the clothes left by the user can be lent to a third party, and transaction availability information indicating whether the clothes left by the user can be sold to a third party; a rental processing means that processes, on the basis of the rental availability information stored in the database, a rental request from a third party who wishes to rent the clothes left by the user; a transaction processing means that processes a purchase request from a third party who wishes to purchase the clothes left by the user; and a DB processing means that updates the information stored in the database in response to a change request to the rental availability information or the transaction availability information from the user.

A method for controlling a fashion database of the present invention includes: a managing step in which a management server manages information on a merchant that keeps and manages clothes, information on a user who leaves clothes with the merchant, rental availability information indicating whether the clothes left by the user can be lent to a third party, and transaction availability information indicating whether the clothes left by the user can be sold to a third party in a database; a rental processing step in which the management server processes, on the basis of the rental availability information, a rental request from a third party who wishes to rent the clothes; a transaction processing step in which the management server processes, on the basis of the transaction availability information, a purchase request from a third party who wishes to purchase the clothes; and a DB processing step in which the information stored in the database is updated in response to a change request to the rental availability information or the transaction availability information from the user.

According to these inventions, the management server can update the rental availability information or the transaction availability information stored in the database in response to a change request to the rental availability information or the transaction availability information from the user and process a rental request or a purchase request from a third party on the basis of the latest rental availability information or transaction availability information, which is always updated.

Furthermore, the database stores disclosure status information indicating whether clothes left by the user is disclosed to a third party. The DB processing means preferably processes an evaluation request from the third party to the clothes left by the user, the disclosure status information of which being set to disclosure to public, and a change request to the disclosure status information from the user. Thus, the user can select whether or not to disclose the clothes left by the user to the third party and the third party can evaluate only clothes disclosed to public.

Furthermore, the database preferably includes a wearing period of the clothes left by the user or care history information indicating a care service usage history. This allows the third party to decide whether or not to wish to rent or purchase with reference to such a care history.

The fashion database system of the present invention preferably includes a DB processing means that notifies the merchant that keeps and manages the clothes left by the user of a collection request in response to a request to keep clothes including information on the merchant that keeps and manages the clothes left by the user on the basis of the information on the merchant that keeps and manages the clothes left by the user stored in the database. In this way, the user only has to send a request to keep clothes and notify the merchant that keeps and manages the clothes of the collection request, thus enabling a speedy collection of the clothes.

The fashion database system of the present invention preferably includes a donation processing means that stores donation availability information indicating whether the clothes left by the user should be a donation target and processes a donation request to wish to donate the clothes left by the user on the basis of the donation availability information stored in the database. This allows the user to include not only renting or purchasing but also donating the clothes left by the user as one choice.

The database of the present invention stores information including a rental history or purchase history of a third party and information including a type or brand of the clothes left by the user, and preferably includes an advertisement means that notifies the third party of an advertisement on the basis of the rental history or purchase history of the third party stored in the database and notifies the user of an advertisement on the basis of the type or brand of the clothes left by the user. This allows the advertisement of the clothes that matches preferences of the third party or the user to be notified.

A user terminal owned by the user of the present invention preferably includes a clothing recognition means that captures images of the clothes left by the user and recognizes one or more pieces of information of an overall image, a brand or a care label. In this way, the user can acquire the information recognized by the clothing recognition means as images, register the images in the database and thereby manage the clothes left by the user in a visually easy-to-understand manner.

A fashion database program of the present invention is intended to cause a computer to function as a database that manages information on a merchant that keeps and manages clothes, information on a user who leaves clothes with the merchant, rental availability information indicating whether the clothes left by the user can be lent to a third party, and transaction availability information indicating whether the clothes left by the user can be sold to a third party; a rental processing means that processes, on the basis of the rental availability information stored in the database, a rental request from a third party who wishes to rent the clothes; a transaction processing means that processes a purchase request from a third party who wishes to purchase the clothes on the basis of the transaction availability information stored in the database; and a DB processing means that updates the information stored in the database in response to a change request to the rental availability information or the transaction availability information from the user. According to the computer that executes the fashion database program, actions and effects identical or similar to those of the fashion database system of the present invention can be achieved.

Advantageous Effects of Invention

According to the present invention, it is possible to provide a highly convenient fashion database system that manages the clothes left by a user, and then allows the user to make a choice at desired timing.

BRIEF DESCRIPTION OF DRAWINGS

FIG. 2 is a schematic block diagram of a management server according to the embodiment of the present invention.

FIG. 3A is a schematic block diagram of a user terminal according to the embodiment of the present invention and FIG. 3B is a schematic block diagram of a third party terminal according to the embodiment of the present invention.

FIG. 4A is an explanatory diagram illustrating a data structure of a database according to the embodiment of the present invention.

FIG. 4B is an explanatory diagram illustrating the data structure of the database according to the embodiment of the present invention.

FIG. 4C is an explanatory diagram illustrating the data structure of the database according to the embodiment of the present invention.

FIG. 4D is an explanatory diagram illustrating the data structure of the database according to the embodiment of the present invention.

FIG. 4E is an explanatory diagram illustrating the data structure of the database according to the embodiment of the present invention.

Although embodiments of the present invention will be described in detail hereinafter, the description of components described below is an example (typical example) of present embodiments of the present invention and the present invention will not be limited to the following contents unless the gist of the invention is changed.

[Fashion Database System]

Figure 1:
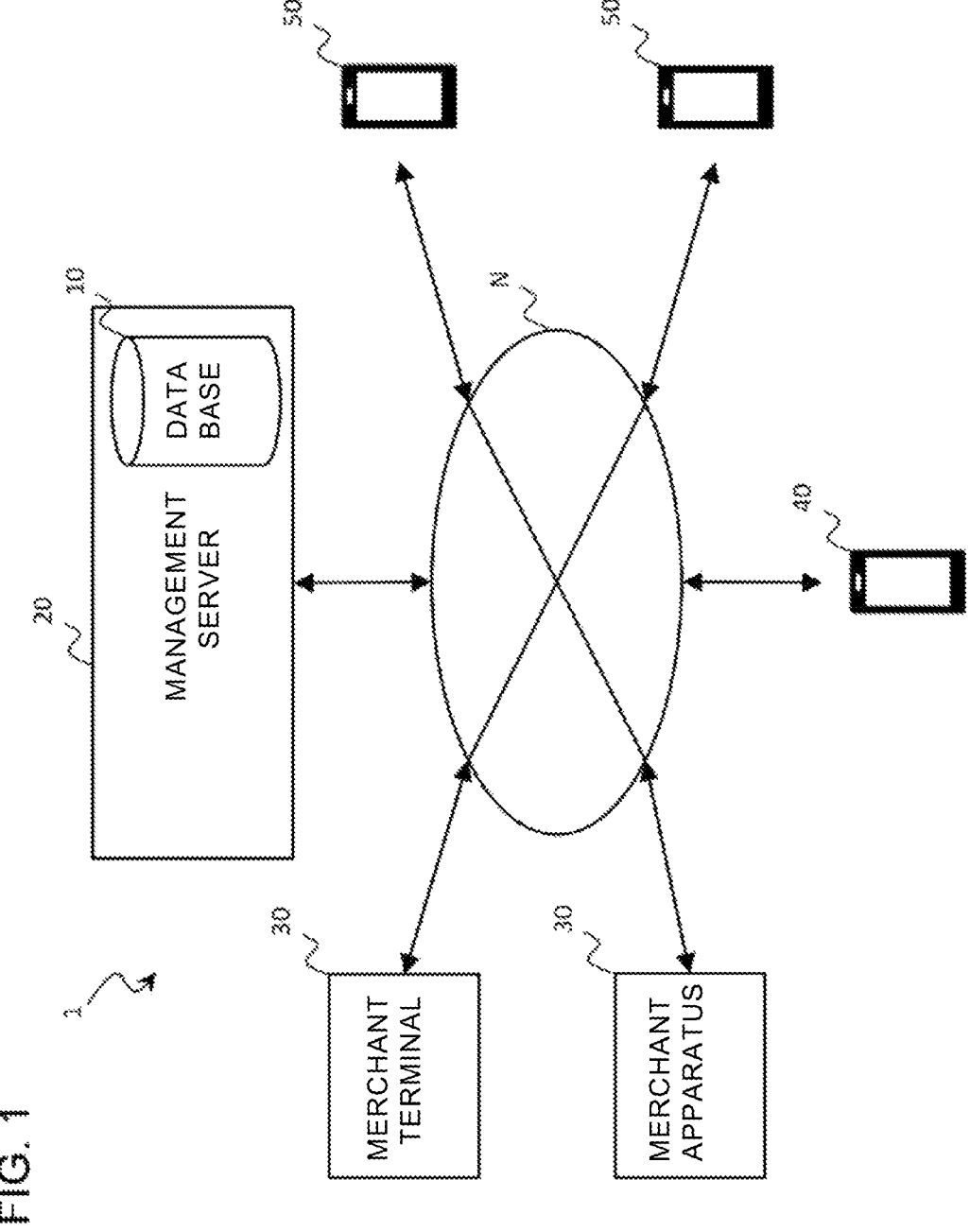
FIG. 1 is a schematic configuration diagram illustrating a fashion database system according to an embodiment of the present invention.

FIG. 1 is a schematic configuration diagram illustrating a fashion database system according to an embodiment of the present invention. The fashion database system 1 is provided with a database 10, a management server 20, a merchant terminal 30, a user terminal 40 owned by a user and a third party terminal 50 owned by a third party. The user is a person who leaves clothes for rental, transaction, donation or the like using the cleaning system database 1. The third party is a person who wishes to rent or purchase the clothes left by the user using the cleaning system database 1. For convenience of description, although the user is separated from the third party, clothes left by a certain user may be rent/purchased by another user. Although the user terminal 40 and the third party terminal 50 are assumed to have different functions, the user terminal 40 may also be provided with a function of the third party terminal 50.

The database 10 is a storage means included in the management server 20 and stores information on a merchant that manages clothes, information on the user who leaves clothes with the merchant and information relating to clothes left by the user.

The information on the merchant that manages clothes refers to a shop ID assigned to each cleaning shop or cleaning box visited by the user to leave clothes, a factory ID assigned to each cleaning factory and their addresses and telephone numbers or the like. When the user brings clothes directly to a factory, the shop to which the shop ID is assigned may be the factory or shop running a different business (convenience store, station, mall or the like) or a shop of a preservation agent (merchant running a preservation service).

Examples of information on a user include a user ID or a third party ID assigned to each user or third party and name, age, gender associated therewith. Examples of information relating to clothes left by a user include a clothing ID assigned to each item of clothes left by the user, a disclosure status, a working status, a size or a category.

[Management Server]

The management server 20 is a server that mutually communicates with the user terminal 40 or the third party terminal 50 via a network N. FIG. 2 is a schematic block diagram illustrating the management server 20 according to the embodiment of the present invention.

The management server 20 includes a communication means 21, a DB processing means 22, a rental processing means 23, a transaction processing means 24, a donation processing means 25 and an advertisement means 26.

The communication means 21 mutually communicates with the user terminal 40 or the third party terminal 50 via the network N.

The DB processing means 22 controls operation such as registering, updating or deleting data in the database 10. The DB processing means 22 creates a search formula and extracts data in the database 10.

The rental processing means 23 processes rental-related requests such as linking the clothing ID indicating clothes the user wishes to leave and rent, and the third party ID indicating the third party who wishes to borrow the clothes. The rental processing means 23 also processes a request relating to an evaluation made by a lender (user) on a borrower (third party) (or vice versa).

The transaction processing means 24 processes sales-related requests such as linking the clothing ID indicating clothes the user wishes to leave and sell, and the third party ID indicating the third party who wants to purchase the clothes. The transaction processing means 24 also processes a request relating to an evaluation made by the seller (user) on the purchaser (third party) (or vice versa).

The donation processing means 25 processes donation-related requests such as linking the clothing ID indicating the clothes the user wishes to leave and donate, and a donation destination ID indicating a donation destination.

The advertisement means 26 notifies the user terminal 40 and the third party terminal 50 of an advertisement on the basis of information on the user and information on the third party registered in the database.

[Terminal]

The merchant terminal 30 is a personal computer or a smartphone installed at a shop of the merchant, and, for example, a personal computer installed at a cleaning shop or a cleaning factory. The merchant terminal 30 may also be a smartphone owned by an employee of the cleaning shop or a factory worker of the cleaning factory.

FIG. 3A is a schematic block diagram of the user terminal 40 according to the embodiment of the present invention. The user terminal 40 is a personal computer, a smartphone or the like owned by the user.

The user terminal 40 includes a terminal communication means C that communicates with the management server 10 and a user operation selection means 41 that selects or determines user-side operation such as rental or transaction. The user terminal 40 also includes a clothing recognition means 42 that captures images of clothes using a camera provided on the user terminal 40 and recognizes an overall image, a bland, a care label thereof or the like. Recognizing an overall image of the imaged clothes means that the user terminal 40 can call attention to the user when the overall image or the like has not been captured correctly, for example, when the clothes are sticking out of the image or blurred.

The clothing recognition means 42 is intended to auto-recognize a brand or a type of clothes from captured images. The clothing recognition means 42 may also recognize images captured using AI. For example, it is possible to learn images of a plurality of types of brand logos or brand marks using Deep Learning, generate a model and perform brand image recognition (brand identification) using the model. In this way, it is possible to recognize brand or care label-related information from the images as characters and handle the information as character data even in the database 10. Note that such captured images may also be recognized on the management server 20 side or images captured by the user terminal 40 may be sent to the management server 20, the management server 20 may perform image recognition and return the result to the user terminal 40.

FIG. 3B is a schematic block diagram of the third party terminal 50 according to the embodiment of the present invention. The third party terminal 50 is a personal computer or a smartphone or the like owned by the third party.

The third party terminal 50 includes a terminal communication means C that communicates with the management server 10 and a third party operation selection means 51 that selects or determines operation on the third party side such as rental or transaction.

[Data Structure]

FIGS. 4A to 4E are explanatory diagrams illustrating a data structure of the database according to the embodiment of the present invention. FIG. 4A shows a data structure of data using the user ID as a main key. The user ID is an ID that identifies the user and the clothing ID is an ID that identifies the clothes left by the user for whom the user ID is set. The shop ID is an ID that identifies a cleaning shop or a cleaning box or the like where the clothes are kept and the factory ID is an ID that identifies a cleaning factory where clothes are managed in cleaning, storage or the like.

A disclosure status is a status indicating how the clothes left are treated, including statuses of disclosed to public, not disclosed to public, rental, transaction or donation. When the disclosure status is rental, transaction or the like, it indicates that the user wishes rental (lending), transaction (sale) of the clothes or the like. Therefore, when the disclosure status is rental, transaction or the like, its fee (rental fee per day, selling price or the like) is also linked. Note that when the disclosure status is transaction, whether bargaining is possible is also linked. That is, the disclosure status is disclosure availability information, rental availability information, transaction availability information, donation availability information, indicating whether disclosure to the third party may be possible.

On the other hand, when the disclosure status is closed to public, the clothes are not made public, not eligible for rental, transaction or the like and also excluded from search (not hit in search). Note that in the case of disclosed to public (though not eligible for rental, transaction or the like, the clothes are disclosed to a third party), the clothes do hit in search. Because of the hit in search, comments such as a price or bargaining request assigned to the hit clothes by the third party or the number of "likes" used in SNS (that is, evaluation information on the clothes) are also recorded in association with the clothing ID.

FIG. 4B illustrates a data structure of data relating to information on the clothes using the clothing ID as the main key. Examples of the data relating to information on the clothes include an overall image, brand, care label, size and category of the clothes.

Regarding the overall image, brand, care label of the clothes, image data with an overall image or the like captured and transmitted by the clothing recognition means of the user terminal 40 is stored with a file path and in a binary format.

FIG. 4C illustrates a data structure of data relating to the current situation of the clothes using the clothing ID as the main key. Examples of the data relating to the current situation of clothes include a working condition, a storage site, a borrower, a date of receipt and a care history ID. Examples of the working condition include whether the user wishes rental of the clothes, "waiting for borrower," "being rent" or "in storage" because the user does not wish rental, transaction or the like or "being kept (waiting for collection)" at a cleaning shop. The storage site is data which is effective only when the working condition is "in storage." The "borrower" is data which is effective only when the working condition is "being rent."

FIG. 4D illustrates a data structure of data relating to the user using the user ID as the main key. Examples of the data relating to the user include a name, age, gender, address.

Data relating to a renter/purchaser (third party) of the clothes left by the user is also recorded in the database 10. Examples of the data relating to the third party include rental/purchase history and evaluation. The "evaluation" is a psychological evaluation given by the user as the lender/ seller to the third party as the borrower/purchaser concerning how well the third party treated the rented/sold clothes. For example, when the user determines that the rented clothes have been well treated, the user gives the third party an evaluation of "5" out of 5 levels. Such an evaluation may be expressed on a 100-point scale or expressed with the number of "likes."

FIG. 4E illustrates a data structure relating to data of a care history using a care history ID as the main key. Examples of the data of a care history include a purchase date and a wearing period calculated from the purchase date, the date on which care has been done and the contents of the care, a total number of times the care has been done.

[Operation Screen of User Terminal]

FIGS. 5A to 5G are explanatory diagrams illustrating operation screens of the user terminal according to the embodiment of the present invention. The user logs in to the management server 20 from the owned user terminal 40 using an account and a password. After logging in, the user makes a reservation (order) for keeping clothes by specifying the amount of clothes left (e.g., when 3 clothing items are left, the user checks LP3), selecting a leaving destination from a leaving destination selection item 401 (see FIG. 5A). After bringing the clothes to and leaving them at a cleaning shop or a cleaning box, the user presses a (Leave) button to confirm the leaving of clothes (see FIG. 5B).

Figure 5A:
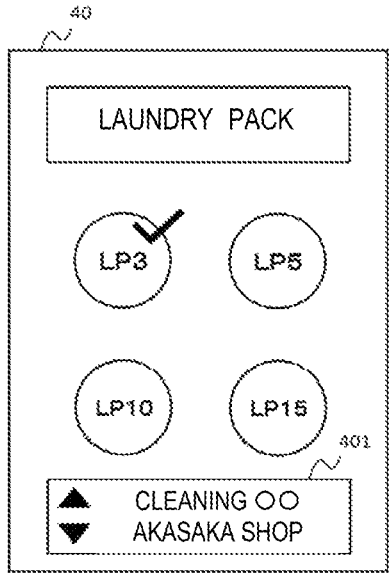
FIG. 5A is an explanatory diagram illustrating an operation screen of the user terminal according to the embodiment of the present invention.
Figure 5B:
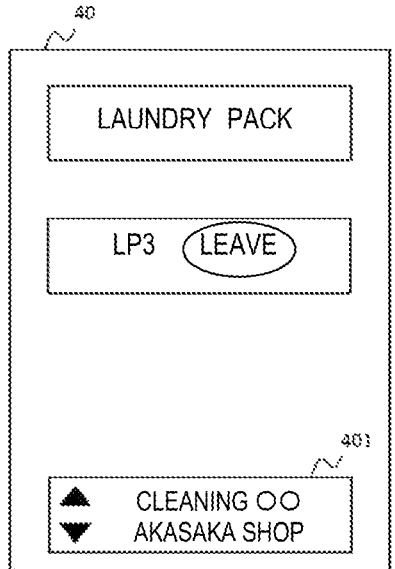
FIG. 5B is an explanatory diagram illustrating an operation screen of the user terminal according to the embodiment of the present invention.
Figure 5C:
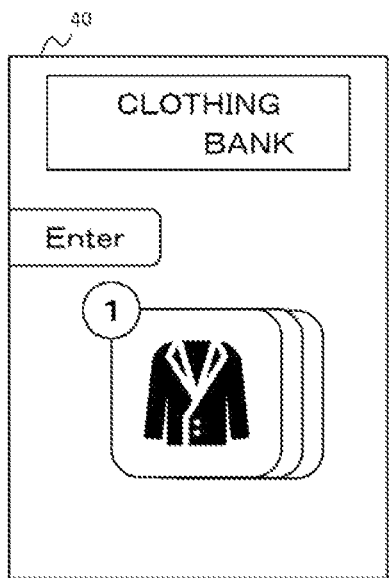
FIG. 5C is an explanatory diagram illustrating an operation screen of the user terminal according to the embodiment of the present invention.

FIG. 5C illustrates a screen from which the user can browse a list of clothes left by the user. When the number of left clothing items is plural, by laterally sliding the overall image of clothes displayed, the next left clothing items are displayed. When the user operates the user terminal 40 and presses an "Enter" button, a screen of detailed information on the clothes displayed on the user terminal 40 is displayed (see FIG. 5D).

Examples of the detailed information on the clothes include an overall image, a brand, a size, a care label or a date of receipt. The user can select disclosure to public, availability (on/off) of rental, transaction or donation of the clothes left by the user. For example, when disclosure to public is on, the clothes are disclosed to the third party and the clothes do hit in search by the third party. On the other hand, when disclosure to public is off, the clothes are not disclosed to the third party and the clothes do not hit in search by the third party.

Figure 5D:
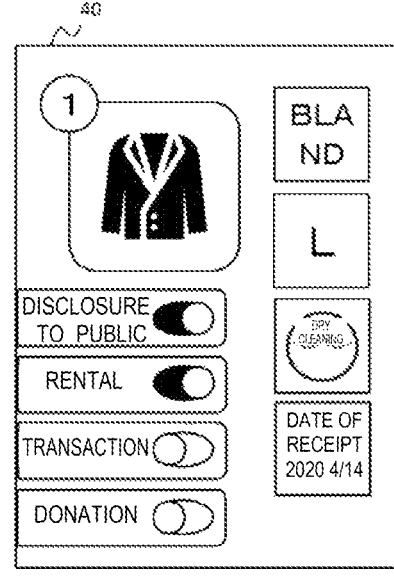
FIG. 5D is an explanatory diagram illustrating an operation screen of the user terminal according to the embodiment of the present invention.
Figure 5E:
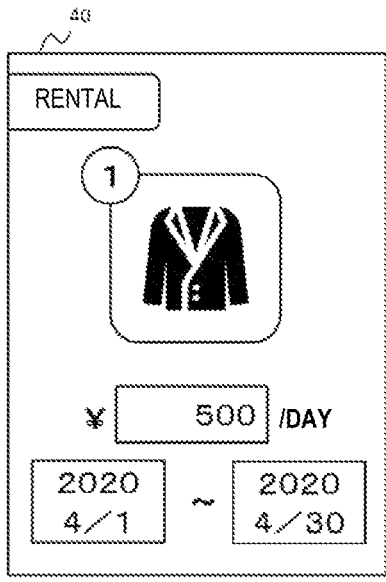
FIG. 5E is an explanatory diagram illustrating an operation screen of the user terminal according to the embodiment of the present invention.

If rental is set to on, the user can set the rental contents from a rental setting screen (see FIG. 5E). On the rental setting screen, the user can set a rental fee or a rental period.

Figure 5F:
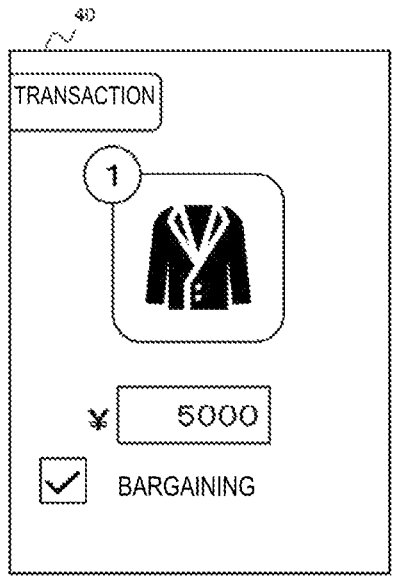
FIG. 5F is an explanatory diagram illustrating an operation screen of the user terminal according to the embodiment of the present invention.

If transaction is set to on, the user can set transaction contents from a transaction setting screen (see FIG. 5F). On the transaction setting screen, the user can set a selling price or bargaining availability.

Figure 5G:
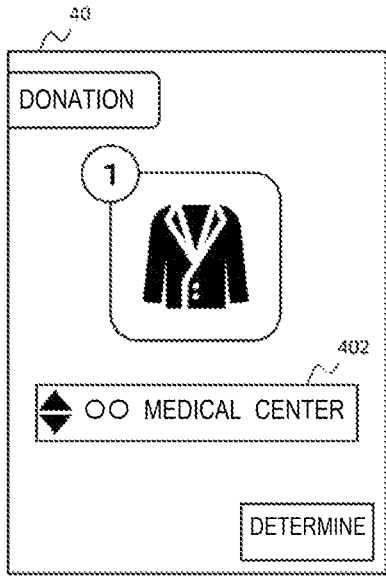
FIG. 5G is an explanatory diagram illustrating an operation screen of the user terminal according to the embodiment of the present invention.

If a donation is set to on, the user can set donation contents from a donation setting screen (see FIG. 5G). On the donation setting screen, the user can select a donation destination from a donation destination selection item 402.

Disclosure to public of clothes left by the user and availability (on/off) of rental, transaction and donation are realized when the user makes a selection from the user terminal 40, a selection notice is transmitted from the user terminal 40 to the management server 20 and the management server 20 that has received the selection notice updates contents of the database 10 via the DB processing means 22. Thus, the user can easily grasp all the clothes left by the user from the owned user terminal 40 and easily make subsequent choices of the clothes left by the user anytime, anywhere.

[Operation Screen of Third Party Terminal]

Figure 6A:
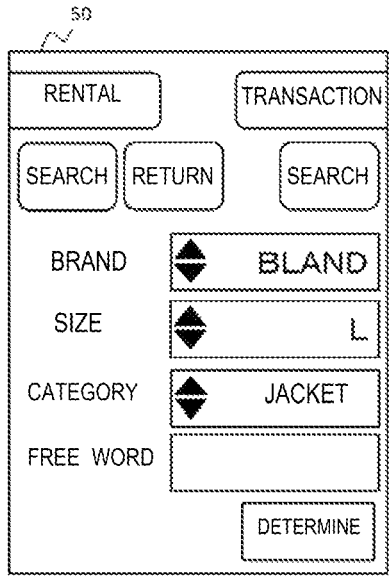
FIG. 6A is an explanatory diagram illustrating an operation screen of a third party terminal according to the embodiment of the present invention.
Figure 6B:
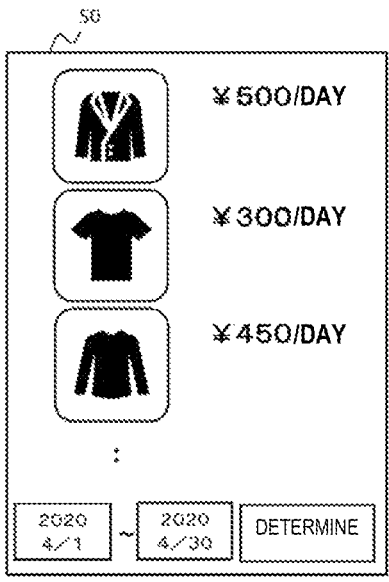
FIG. 6B is an explanatory diagram illustrating an operation screen of the third party terminal according to the embodiment of the present invention.
Figure 6C:
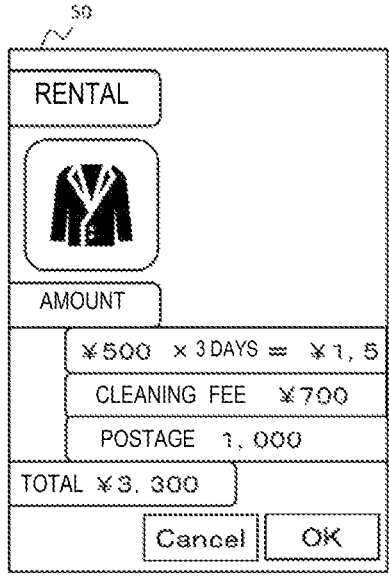
FIG. 6C is an explanatory diagram illustrating an operation screen of the third party terminal according to the embodiment of the present invention.

FIGS. 6A to 6C are explanatory diagrams illustrating operation screens of the third party terminal according to the embodiment of the present invention. The third party logs in to the management server 20 from the owned third party terminal 50 using an account or a password. Note that the fashion database system 1 may be adapted so that the third party is allowed to receive a rental or transaction service by temporarily inputting a name, address or the like without the need to log in to the management server 20.

The third party selects a service to find clothes to borrow, return borrowed clothes, find clothes to buy or the like after logging in (see FIG. 6A). Clothes can be searched using a brand, size, category or other free words.

After the search, the third party selects clothes to borrow/buy from among hit clothes. FIG. 6B illustrates a search result when the third party finds clothes to borrow. Since a list of hit clothes is displayed, the third party can select clothes with preferences or fees taken into account. Note that when the icon of an overall image of clothes is pressed, detailed information on the brand, size, care label or the like of the clothes can be browsed (not shown). After selecting clothes to borrow, the third party specifies a rental period, presses a decision button and proceeds with a rental payment procedure.

Note that the detailed information on the clothes also displays a care history to be stored in the database 10 (see FIG. 4E). This allows the third party to perform rental or transaction considering reliability of a usage status of each item, too.

FIG. 6C illustrates a rental payment procedure screen. The third party checks a total amount and confirms the rental. In the case of buying, as in the case of borrowing, the third party selects clothes to buy, and finally performs the payment procedure.

When the destination of clothes left by the user is a cleaning shop or cleaning box, since the clothes subject to rental/transaction have been cleaned, the third party can always borrow/buy clean clothes with confidence. Users no longer have to take their clothes out for cleaning for rental and sales purposes.

[Explanation of Operation and Usage Status]

Figure 7:
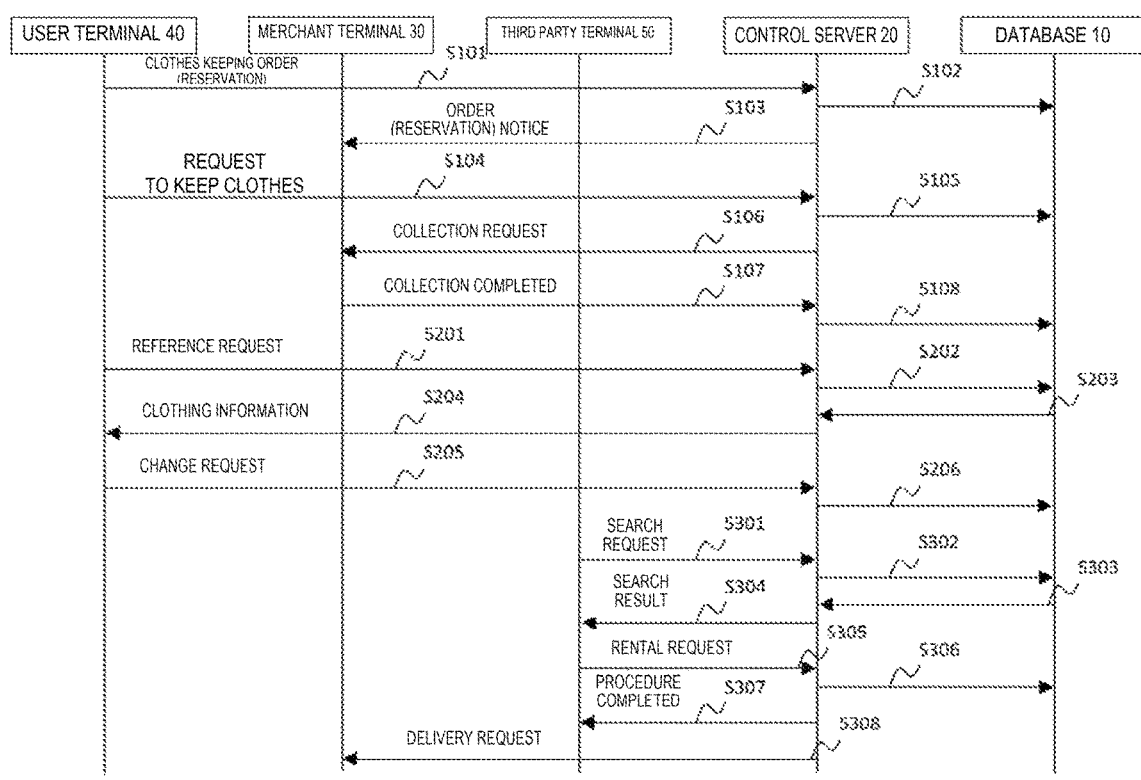
FIG. 7 is a flowchart illustrating a procedure after the user leaves clothes until the clothes are rented to a third party.

The embodiment of the present invention will be described with reference to FIGS. 1 to 6, and a flowchart shown in FIG. 7. FIG. 7 is a flowchart illustrating a procedure after the user leaves clothes until clothes are rent to the third party. Suppose that the user will use a cleaning box when leaving clothes. The user terminal 40 has an application having functions of the user operation selection means 41 and the clothing recognition means 42 installed in a smartphone owned by the user, and the third party terminal 50 has an application having functions of the third party operation selection means 51 installed in the smartphone owned by the third party.

[Until User Leaves Clothes]

The user selects, in advance, the amount of clothes to be left and a cleaning box, which is the leaving destination using the function of the user operation selection means 41 of the owned user terminal 40, and places an order (makes a reservation) (see FIG. 5A). The user operation selection means 41 transmits a clothes leaving order (making a reservation) including information such as a user ID, a shop ID and the amount of clothes to the management server 20 via the terminal communication means C (S101). The DB processing means 22 of the management server 20 searches for a mail address or the like of cleaning factory personnel in charge of a cleaning box with its shop ID assigned from the database 10 on the basis of the shop ID included in the received clothes leaving order (reservation) (S102). The DB processing means 22 sends a notice (e-mail transmission or the like of order (reservation)) to the merchant terminal 30 installed in the cleaning factory (S103).

Then, the user brings clothes to be left to the cleaning box and deposits the clothes. After the depositing, the user presses the (leave) button and confirms the leaving of the clothes using the functions of the user operation selection means 41 of the owned user terminal 40 (see FIG. 5B). The user operation selection means 41 transmits a request to keep clothes including confirmation information such as the user ID, shop ID, amount of clothes to the management server 20 via the terminal communication means C (S104). Here, the overall image of the clothes recognized (imaged) in advance by the clothing recognition means 41 of the user terminal 40, brand, care label or the like are also transmitted as image data to the management server 20. The DB processing means 22 of the management server 20 registers the clothing ID assigned to each clothing item and working condition (being left) in the database 10 according to the received request to keep clothes (S105).

The DB processing means 22 determines, from the shop ID transmitted from the user terminal 40, the cleaning factory in charge of the cleaning box in which the clothes are kept and sends a notice (mail transmission of a collection request or the like) to the merchant terminal 30 installed there (S106).

In response to the notice, the cleaning merchant of the cleaning factory collects the clothes kept in the cleaning box according to the contents of the collection request. After the collection, the cleaning merchant sends a collection completion notice from the merchant terminal 30 (S107). The DB processing means 22 registers the shop ID, factory ID, working condition (cleaning in progress) for each clothing ID in the database 10 according to the contents of the received collection completion notice (S108).

Thus, after depositing clothes into the cleaning box, the user needs only to send a request to keep clothes from the user terminal 40 to cause the clothes to be collected speedily, cleaned and stored. Therefore, the user can leave the clothes with a neighborhood cleaning shop or cleaning box as if it were a warehouse owned by the user.

[Until User Wishes Rental]

The user can check a list of left clothes, working condition (whether the clothes have not been collected yet, cleaning is in progress or cleaning has been completed or the like) from the user terminal 40. The user operation selection means 41 of the user terminal 40 transmits a reference request to the management server 20 (S201). The DB processing means 22 of the management server 20 extracts a clothing ID linked with the user ID from the database 10 on the basis of the user ID included in the received reference request (S202, 203). After the extraction, information relating to the clothes left by the user is transmitted to the user terminal 40 (S204).

With reference to the received clothing information, the user changes the setting of clothes to be lent from the clothing information. More specifically, the user sets rental availability to on (available) (see FIG. 5D) and sets a fee or a rentable period on the rental setting screen (see FIG. 5E). When the setting is confirmed, the user operation selection means 41 transmits the change request to the management server 20 (S205). The rental processing means 23 of the management server 20 updates the working condition (waiting for borrower) or the like in the database 10 according to the contents of the received change request (S206).

[Until Clothes are Rent to Third Party]

The third party searches for clothes to be rent using the function of the third party operation selection means 51 of the owned third party terminal 50 (see FIG. 6A). The third party operation selection means 51 transmits a search request including information on the brand, size or the like used for the search to the management server 20 via the terminal communication means C (S301). The rental processing means 23 of the management server 20 creates a conditional expression on the basis of the condition included in the received search request and extracts a clothing ID that matches the condition from the database 10 (S302, 303). After the extraction, the search result is transmitted to the third party terminal 50 (S304).

With reference to the received search result, the third party determines the clothes to be borrowed from among the clothes in the result (FIG. 6B). When the clothes to be borrowed are determined and a payment procedure is confirmed, the third party operation selection means 51 transmits a rental request to the management server 20 (S305). The rental processing means 23 performs a payment procedure according to the contents of the received rental request and updates the working condition (being rent) or the borrower or the like in the database 10 (S306). More specifically, the rental processing means 23 updates the working condition of the borrowed clothing ID from "waiting for borrower" to "being rent" and updates the borrower from "- (none)" to "rental user ID."

After that, the rental processing means 23 transmits the information that the rental procedure has been completed to the third party terminal 50 (S307). With reference to the factory ID linked to the clothing ID, a notice (mail requesting delivery or the like) is sent to the merchant terminal 30 installed in the cleaning factory where the clothes determined to be rent are stored (S308).

Although the procedure after the user leaves the clothes until the clothes are rent to the third party has been described in the present embodiment, the same is applied to a procedure until the clothes are purchased by the third party or a procedure until the clothes are donated. Thus, the user can easily select or determine various choices such as rental, sales, donation anytime. The present invention can add choices as appropriate according to the user's need besides these choices.

When the user leaves clothes, the user may confirm the deposit of clothes by causing a reader installed at the cleaning shop or a camera provided for the cleaning box to read a QR code (registered trademark) displayed on the user terminal 40 or a QR code (registered trademark) printed on a bag to stuff laundry. Moreover, an IC chip attached to the bag may be detected by a sensor or other methods may be used, too.

Note that the management server 20 may be provided with the function of the user operation selection means 41 or the third party selection means 51 so that the function may be browser-accessed from a personal computer or a smartphone owned by the user or the third party to thereby select or determine the operation on the user side or on the third party side.

Furthermore, the present invention is not limited to clothes, but may also be applicable to items like shoes, bags or the like that can be rent, sold or donated.

[Storage]

After leaving the clothes, the user may set the disclosure status to "closed to public" to thereby store the clothes (see FIG. 5D). In that case, the working condition of the clothes is "in storage," a state in which the clothes do not hit in search by a third party, and so, the clothes are kept in storage at a storage site such as a warehouse (see FIG. 4C). This makes it possible to make a choice of the clothes left by the user at desired timing. Note that if the user changes his/her mind while leaving the clothes, the user may send a return request from the user terminal to wear the clothes himself/herself again.

[Advertisement]

Furthermore, the advertisement means 26 of the management server 20 (see FIG. 2) notifies the user terminal 40 or the third party terminal 50 of an advertisement on the basis of (with reference to) information on the user or information on the third party registered in the database. The information on the user referenced when notifying the advertisement is the type or brand or the like of the clothes left by the user. For example, if the user leaves only clothes of a specific brand, the advertisement means 26 notifies the user terminal 40 of the advertisement relating to a new brand thereof. If the user leaves a lot of clothes of a specific type such as T-shirts or suits, the advertisement means 26 notifies the user terminal 40 of an advertisement relating to new T-shirts or suits.

Examples of the information on the third party referenced when notifying the advertisement include a rental history, purchase history, search history, browsing history of the third party. For example, when the third party purchases only items of a specific brand, the advertisement means 26 notifies the third party terminal 50 of an advertisement relating to the brand.

More specifically, when the user leaves clothes of a certain brand and wishes rental or transaction, the advertisement means 26 notifies the third party who is determined to be interested in the brand of the advertisement. Since the third party is interested in the brand, the user's need to lend/sell matches the third party's need to borrow/buy, and thus rental or transaction is conducted smoothly. Therefore, using the present invention, if the user makes a choice of wishing to lend/sell clothes to be left, the user can smoothly conduct rental or transaction in line with his/her wishes.

[Evaluation]

Before lending or selling clothes, the user can make reference to an evaluation on the clothes deposited. If the disclosure status of the clothes deposited is a disclosure to public, the clothes are not a rental or transaction target, but since the clothes may hit in search and are given a comment or "Good" from a third party, the user can make reference to the information. For example, the rental processing means 23 of the management server 20 that has received a reference request transmitted from the user selection means 41 of the user terminal 40 may search for evaluation information on the clothes recorded in the database 10 and return the information to the user selection means 41. This allows the user to know comments (pricing or negotiation request) or the number of "Goods" before lending the clothes and start a rental or sale of the clothes only when the user determines that a reasonable price or a high evaluation has been obtained.

When lending or selling the clothes, the user can make reference to information on the third party using the function of the user selection operation means 41 of the user terminal 40. For example, the rental processing means 23 of the management server 20 that has received a reference request transmitted from the user selection means 41 of the user terminal 40 may search for a rental history or evaluation included in the information on the third party recorded in the database 10 and return the information to the user selection means 41. This allows the user to know people who have a high evaluation (people who will treat the deposited clothes well) when lending the clothes and lend the clothes to only those who will treat the deposited clothes well.

In this way, using the present invention, the user can easily obtain evaluations on the deposited clothes or information on the third party who lends/sells the deposited clothes, and can thereby sufficiently examine a choice concerning how the deposited clothes are treated after the deposit. After careful consideration, the user can easily make a choice from the user terminal owned by the user.

INDUSTRIAL APPLICABILITY

The present invention is industrially useful as a highly convenient fashion database system that can manage clothes left by a user, allow the user to make a choice of the deposited clothes at desired timing and especially manage clothes that are no longer needed but are difficult to dispose of.

REFERENCE SIGNS LIST 1 fashion database system
10 database
20 management server
21 communication means
22 DB processing means
23 rental processing means
24 transaction processing means
25 donation processing means
26 advertisement means
30 merchant terminal
40 user terminal
401 leaving destination selection item
402 donation destination selection item
41 user operation selection means
42 clothing recognition means
50 third party terminal
51 third party operation selection means
C terminal communication means
N network

What is claimed is:

1. A fashion database system comprising:
a management server comprising one or more processors;
a database comprising one or more storages linked to the one or more processors, the data base managing information on a merchant that keeps and manages clothes, information on a user who leaves clothes with the merchant, rental availability information indicating whether the clothes left by the user can be lent to a third party, transaction availability information indicating whether the clothes left by the user can be sold to a third party and disclosure status information indicating whether information relating to the clothes left by the user is disclosed to the third party;
a merchant terminal held by the merchant;
a DB processing means that updates the information stored in the database in response to a change request to the rental availability information, the transaction availability information or the disclosure status information from the user, the DB processing means sending the information to the merchant terminal when the information is updated;
a rental processing means that processes, on the basis of the rental availability information stored in the database, a rental request from a third party who wishes to rent the clothes left by the user;
a transaction processing means that processes, on the basis of the transaction availability information stored in the database, a purchase request from a third party who wishes to purchase the clothes left by the user; and
a user terminal owned by the user including a clothing recognition means comprising a camera that captures an overall image of each of the clothes left by the user, wherein the user terminal comprises a user operation selection means that selects or determines user-side operation including rental or transaction,
wherein, based on the overall image, by employing AI, the clothing recognition means recognizes one or more pieces of information of the overall image, and a brand or a care label of each of the clothes, thereby recognizing information related to the brand or the care label from the overall image as character by referring to data in the database such that the information is managed as character data in the database, and
wherein the DB processing means processes an evaluation request from the third party on the clothes left by the user, the disclosure status information of which being set to disclosure to public.

2. The fashion database system according to claim 1, wherein the database comprises a wearing period of the clothes left by the user or a care history information indicating a care service usage history.

3. The fashion database system according to claim 1, further comprising a DB processing means that notifies, on the basis of the information on the merchant that keeps and manages the clothes left by the user stored in the database, the merchant that keeps and manages the clothes left by the user of a collection request in response to a request to keep clothes including the information on the merchant that keeps and manages the clothes left by the user.

4. The fashion database system according to claim 1, wherein
the database stores donation availability information indicating whether the clothes left by the user are eligible for donation, and
the fashion database system comprises a donation processing means that processes a donation request to donate the clothes left by the user on the basis of the donation availability information stored in the database.

5. The fashion database system according to claim 1, wherein
the database stores information including a rental history or a purchase history of the third party and information including a type or brand of the clothes left by the user, and
the fashion database system comprises an advertisement means that notifies the third party of an advertisement on the basis of the rental history or purchase history of the third party stored in the database and notifies the user of an advertisement on the basis of the type or brand of the clothes left by the user stored in the database.

6. The fashion database system according to claim 1, wherein the AI is configured to learn images of a plurality of types of brand logos or brand marks and generate a model, thereby performing brand image recognition for brand identification based on the model.

7. A non-transitory computer readable medium storing a fashion database program containing instructions for causing a computer to perform:
with a database, managing information on a merchant that keeps and manages clothes, information on a user who leaves clothes with the merchant, rental availability information indicating whether the clothes left by the user can be lent to a third party, transaction availability information indicating whether the clothes left by the user can be sold to a third party and disclosure status information indicating whether information relating to the clothes left by the user is disclosed to the third party;

updating the information stored in the database in response to a change request to the rental availability information, the transaction availability information or the disclosure status information from the user, and sending the information to a merchant terminal held by the merchant when the information is updated;

processing, on the basis of the rental availability information stored in the database, a rental request from a third party who wishes to rent the clothes left by the user;

processing, on the basis of the transaction availability information stored in the database, a purchase request from a third party who wishes to purchase the clothes left by the use;

with a user terminal, by employing AI, capturing an overall image of each of the clothes left by the user and, based on the overall image, recognizing one or more pieces of information of the overall image, and a brand or a care label of each of the clothes, thereby recognizing information related to the brand or the care label from the overall image as character by referring to data in the database such that the information is managed as character data in the database, wherein the user terminal comprises a user operation selection means that selects or determines user-side operation including rental or transaction; and processing an evaluation request from the third party on the clothes left by the user, the disclosure status information of which is set to disclosure to public.

8. The non-transitory computer readable medium according to claim 7, wherein the AI is configured to learn images of a plurality of types of brand logos or brand marks and generate a model, thereby performing brand image recognition for brand identification based on the model.

9. A method for controlling a fashion database, comprising:

a managing step in which a management server manages information on a merchant that keeps and manages clothes, information on a user who leaves clothes with the merchant, rental availability information indicating whether the clothes left by the user can be lent to a third party, transaction availability information indicating whether the clothes left by the user can be sold to a third party and disclosure status information indicating whether information relating to the clothes left by the user is disclosed to the third party in a database;

a DB processing step in which the information stored in the database is updated in response to a change request to the rental availability information, the transaction availability information or the disclosure status information from the user, and the information as updated is sent to a merchant terminal held by the merchant;

a rental processing step in which the management server processes, on the basis of the rental availability information, a rental request from a third party who wishes to rent the clothes left by the user;

a transaction processing step in which the management server processes, on the basis of the transaction availability information, a purchase request from a third party who wishes to purchase the clothes left by the user; and a clothing recognition processing step in which, with a user terminal owned by the user, by employing AI, capturing an overall image of each of the clothes left by the user and, based on the overall image, recognizing one or more pieces of information of the overall image, and a brand or a care label of each of the clothes, thereby recognizing information related to the brand or the care label from the overall image as character by referring to data in the database such that the information is managed as character data in the database, wherein the user terminal comprises a user operation selection means that selects or determines user-side operation including rental or transaction, and wherein the DB processing step processes an evaluation request from the third party on the clothes left by the user, the disclosure status information of which being set to disclosure to public.

10. The method according to claim 9, wherein the AI is configured to learn images of a plurality of types of brand logos or brand marks and generate a model, thereby performing brand image recognition for brand identification based on the model.

\* \* \* \* \*